(12) United States Patent
Gaddy et al.

(10) Patent No.: US 7,228,189 B1
(45) Date of Patent: Jun. 5, 2007

(54) SYNCHRONIZED STREAMED PLAYBACK AND RECORDING FOR PERSONAL COMPUTERS

(76) Inventors: John C. Gaddy, 1210 Stafford Dr., Cupertino, CA (US) 95014; John D. Marshall, 823 11th Ave., Redwood City, CA (US) 94063

( * ) Notice: Subject to any disclaimer, the term of this patent is extended or adjusted under 35 U.S.C. 154(b) by 1074 days.

(21) Appl. No.: 09/750,902

(22) Filed: Dec. 27, 2000

(51) Int. Cl.
*G06F 17/00* (2006.01)
*G06F 9/445* (2006.01)
*G09B 5/04* (2006.01)

(52) U.S. Cl. .................... 700/94; 717/178; 434/319
(58) Field of Classification Search ............ 700/94; 717/178; 434/319
See application file for complete search history.

(56) References Cited

U.S. PATENT DOCUMENTS

| 5,341,253 | A | | 8/1994 | Liao et al. ............ 360/61 |
|---|---|---|---|---|
| 5,365,579 | A | * | 11/1994 | Hendrickson ......... 379/102.01 |
| 5,491,751 | A | * | 2/1996 | Paulson et al. ............ 705/51 |
| 5,608,707 | A | | 3/1997 | Ogawa et al. ............ 369/84 |
| 6,175,872 | B1 | * | 1/2001 | Neumann et al. ........ 709/231 |
| 6,211,872 | B1 | * | 4/2001 | Matsutsuka et al. ...... 715/744 |
| 6,288,753 | B1 | * | 9/2001 | DeNicola et al. ........ 348/586 |
| 6,639,138 | B1 | * | 10/2003 | Hester ................ 84/470 R |
| 2002/0026256 | A1 | * | 2/2002 | Hilton ................. 700/94 |

* cited by examiner

*Primary Examiner*—Sinh Tran
*Assistant Examiner*—Daniel R. Sellers
(74) *Attorney, Agent, or Firm*—Brinks Hofer Gilson & Lione

(57) ABSTRACT

A method is provided for synchronizing an audio capture program with a streamed audio file. The method comprises receiving at least one selection request from a user connected to a server device, the transmission of a program from the server device to the user client device, the streaming of digital audio data from the server device to the client device, and the detection of state changes associated with an audio stream player disposed within the client device. The transmitted program prepares an audio capture program on the client device in response to state changes associated with the audio stream player and initiates audio capture at a fixed time interval from when the playback state change is detected.

69 Claims, 8 Drawing Sheets

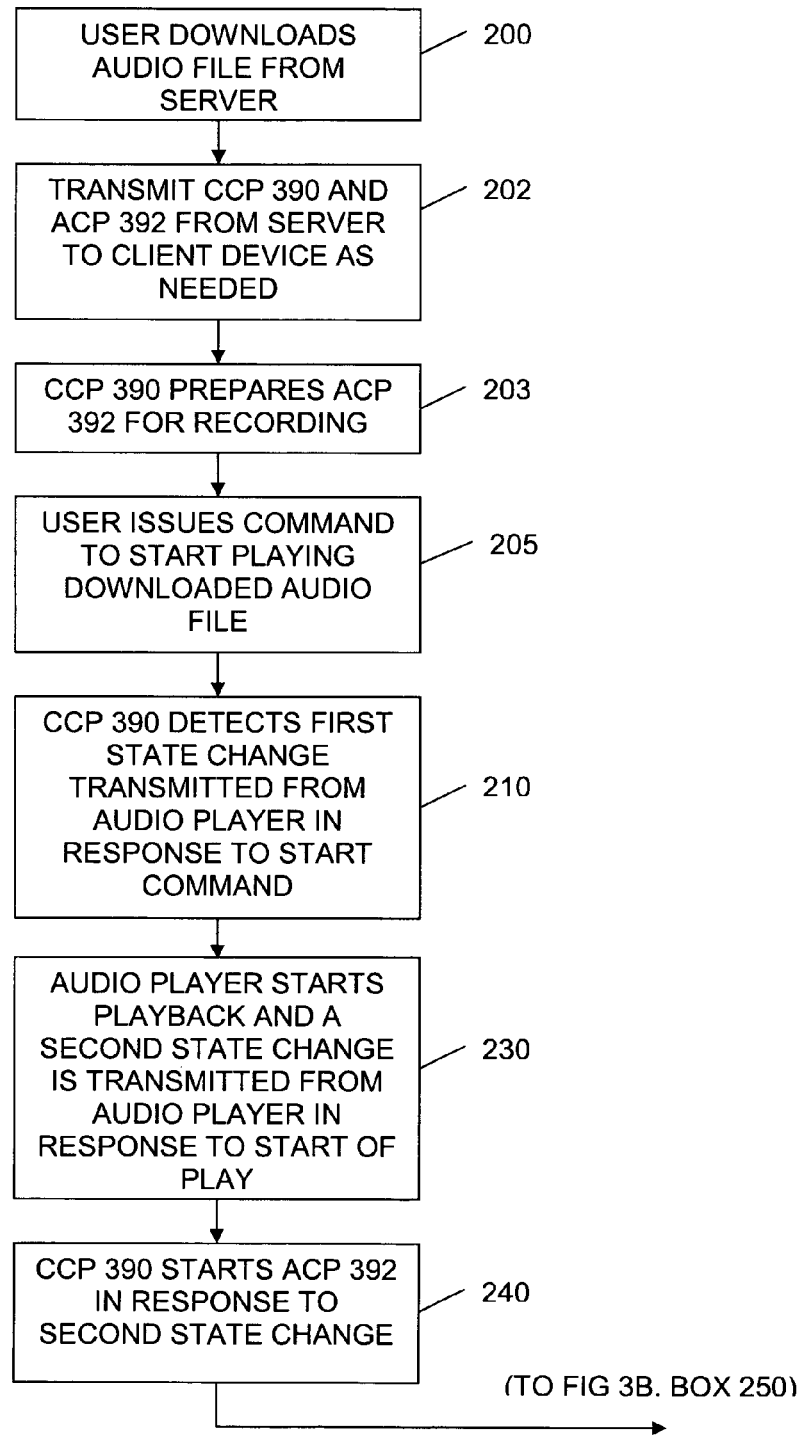
FIGURE 3A (alternative embodiment)

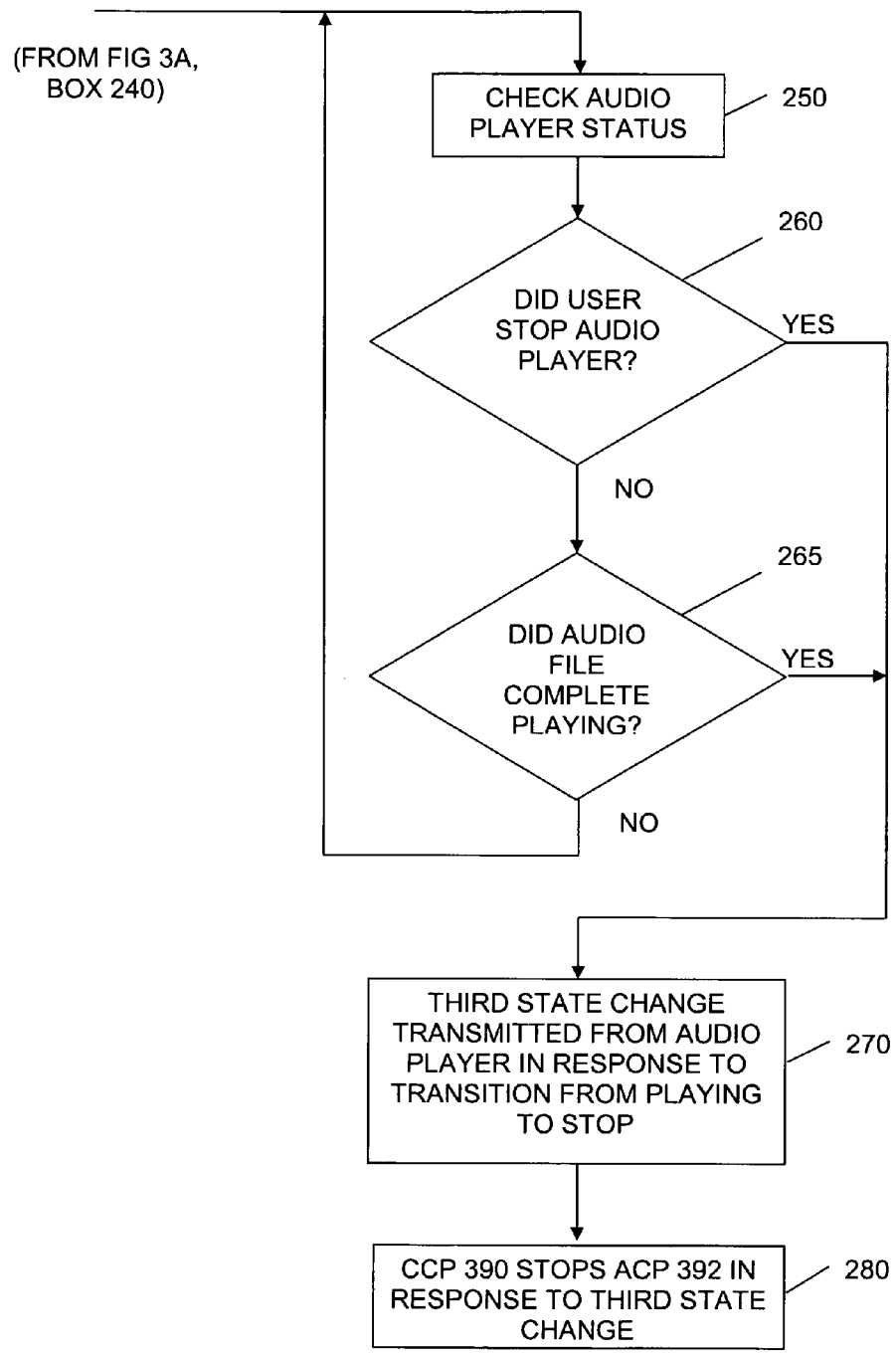
FIGURE 3B (alternative embodiment)

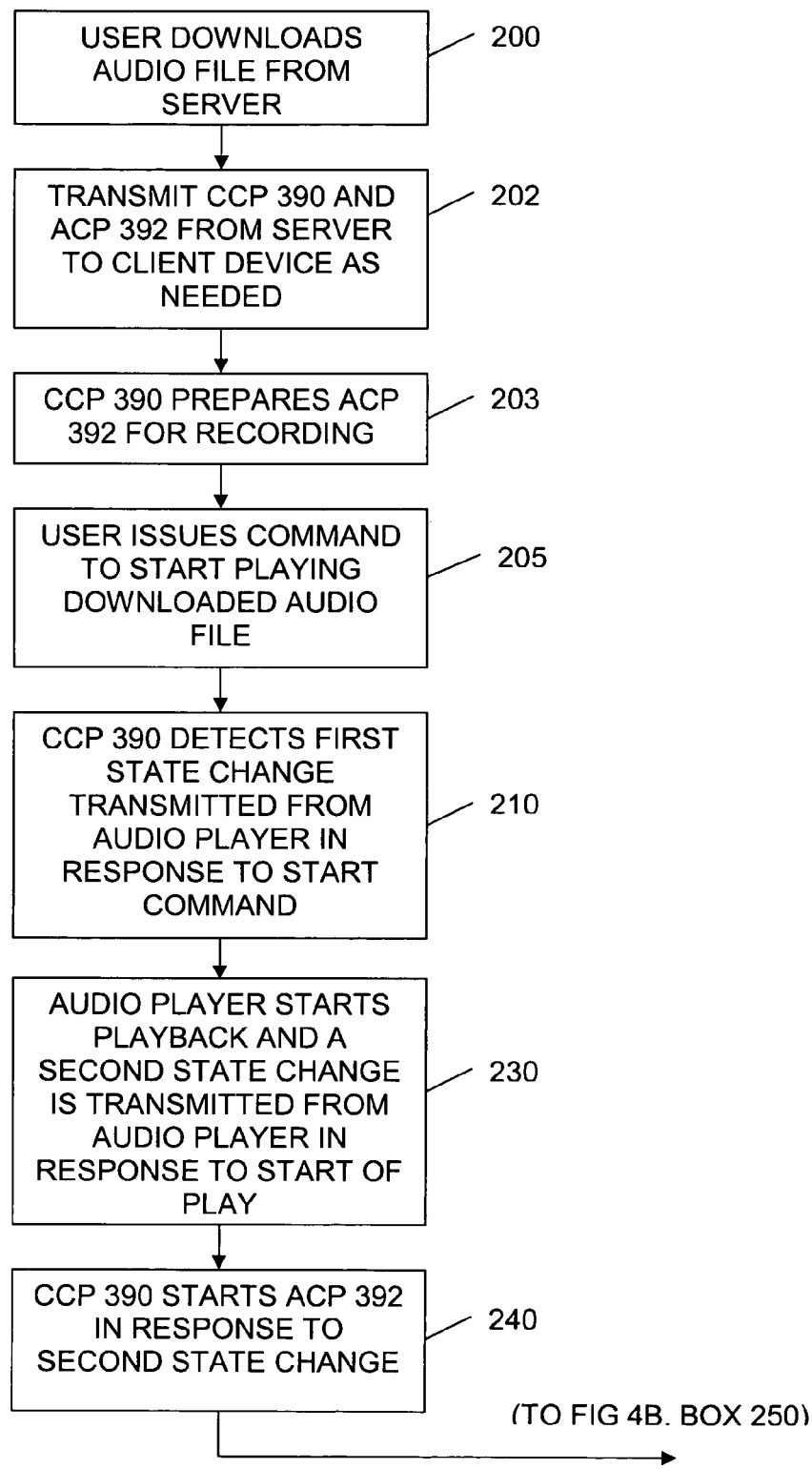
FIGURE 4A (alternative embodiment)

(alternative embodiment)

SYNCHRONIZED STREAMED PLAYBACK AND RECORDING FOR PERSONAL COMPUTERS

FIELD OF THE INVENTION

The present invention relates to the recording of audio files. More particularly the invention relates to the synchronization of an audio capture device and an audio playback device on a personal computer.

PRIOR ART

In order to create an original "master recording" of a musical ensemble performance a recording engineer must be employed. A recording engineer is responsible for running the mixer, a device that allows the recording engineer to adjust the volume levels and tone of each musical instrument to create a balance of the instruments that is aesthetically pleasing. Additionally, the mixing board allows a recording engineer to combine a multi-track recording into a two track stereo master recording. For example, a simple recording of a garage band may have four tracks, one track for the lead vocal, a second track for guitar, a third track for the bass, and a fourth track for drums. By recording each of the instruments on a separate track, the volume levels and tone of each instrument can be adjusted separately to fine-tune the overall sound of the recording. Then, after the levels are adjusted, the four-track recording is mixed down to a two track stereo recording.

In order to make a multi-track recording, the sound engineer must make sure that the timing of each track is exactly synchronized with each other. If one track is not exactly in synch with the others, then the finished recording will have an undesirable sound due to the misalignment of the tracks. For example, the bass may be out of synch with and therefore interfere with the vocalist.

Additionally, in order to make a multi-track recording, an artist must have the necessary equipment or hire a recording engineer who has the necessary equipment to make the recording. Furthermore, the recording engineer must be paid for services. Many artists cannot afford to hire a recording engineer every time they wish to make a recording. For example, artists may wish to make a recording so that they can review their performance. Additionally, an artist may wish to make a recording of a practice session so that the artist can then replay his or her performance for a music teacher to critique.

Personal computers running Windows® software have Windows Media Player included in the operating system. When this simple audio recording program is coupled with a sound card, it provides one-track audio recording capability using an inexpensive microphone.

If the user is unsatisfied with the one track recording provided by pre-installed programs such as Windows Media Player, then the user may choose a multi-track program that is compatible with Windows® DirectSoundCapture capabilities. Although these programs allow users to capture multi-track audio on a computer, using them requires much skill in the art. Extensive and complex instruction manuals are included, and technical support is often required after users study the manuals. Then experience with the software is needed before users become proficient enough to make a recording.

With the advent of the Internet, an artist could log onto the Internet and find downloadable accompaniment over which the artist could record a part using multi-track software. Using this method, a musician would not need to assemble a complete band or be a multi-instrumentalist in order to make a multi-track recording. However, the files containing this accompaniment would be extremely large. For example, if a singer were to download a piano, bass and drum track for a three-minute song, the total size of the stereo file would be 31.8 MB, which would take at least 1 hour and 15 minutes to download over a 56 kbps modem. The download time would be shorter if the singer had a faster, broadband connection to the Internet, such as ISDN or a cable modem. However, many people, especially people in small towns and rural areas, do not have access to broadband services.

To address the problem of the time it takes to download audio files, software programs were developed that allow users to "stream" audio files from a server to which they can connect over the Internet or an intranet. The streamed audio is not downloaded onto a client computer. The audio stream player simply receives a signal and plays the files, similar to how a radio plays a signal without capturing it on the user's radio for later playback. Software components such as RealPlayer® produced by RealNetworks, Inc. allow users to play a streamed audio file on their computer at different levels of quality, depending on the speed of their Internet connection. When a digital audio file is streamed over a network, a server sends the file piecemeal over a network to a client computer. The client buffers the incoming data and monitors the delivery rate of the data from the server. If the client software determines that the network bandwidth is insufficient to render the audio file in an uninterrupted fashion, it signals the server to switch over to a lower bandwidth version of the audio data and the streaming and rendering continue uninterrupted. Conversely, if network conditions improve, the client software signals the server to switch to a higher bandwidth stream and a higher quality audio signal is rendered.

As mentioned above, artists may wish to stream an audio file of a musical performance in which they will perform a part. For example, an artist may wish to practice his or her singing, so the artist would choose to stream an audio file from a server that contains accompaniment. The artist would log onto a network where the artist could gain access to a proprietary server from which the files would be streamed. Then if the artist wished to record his or her song with the streamed accompaniment, the artist would need to connect a microphone to the sound card, which would convert the analog audio captured by the microphone to digital data. The digital data could then be copied (recorded) into a file that would contain the digital audio data for playback and for possible mixing with the streamed accompaniment. However, this method would not provide a means of capturing the streamed accompaniment as an audio file that could be mixed with the singing, so that the artist could play back and review a mix of his or her performance that is synchronized with the accompaniment.

To record both the streamed accompaniment and the song, the artist would need to play the streamed accompaniment and begin to record his or her song with it. To synchronize the accompaniment with the performance, the singer would have to carefully watch the control panel of the audio stream player so that the artist could start the recording at exactly the same moment the streamed accompaniment began in order to synchronize the performance with the accompaniment; otherwise it would be very difficult, if not impossible, to later mix them into one file so that they could be played back as one integrated stereo or monaural audio file. Streaming the accompaniment would solve the problem of the time it takes to download files before an artist can start practicing them or recording with them, but it introduces the problem of capturing and adequately synchronizing the accompaniment with a vocal or instrumental performance.

Therefore, there is a need for a method that automatically captures an artist's performance while rendering a streamed accompaniment for the artist to perform with. There is also a need for a method that aligns the start time of an artist's performance with the start time of a streamed accompaniment, so that a mix can be made for playback.

Accordingly, the current invention is described which addresses the need for streaming and rendering an audio program and simultaneously capturing an audio performance in such a way that synchronization of the two audio data sets is guaranteed. The current invention may be used in conjunction with the methods described in co-pending applications "COMPUTER BASED AUTOMATIC AUDIO MIXER" having Ser. No. 09/751,151 filed on Dec. 27, 2000, assigned to Timbral Research Inc, hereby incorporated by reference in its entirety. and "ONLINE COMMUNICATION SYSTEM AND METHOD FOR AURAL STUDIES" having Ser. No. 09/751,150 filed on Dec. 27, 2000, assigned to Timbral Research Inc, hereby incorporated by reference in its entirety. to implement a system which address the needs for automatic mixing and an online system for teachers and students to engage in aural studies, such as music and language.

SUMMARY OF THE INVENTION

The present invention provides a method and apparatus for the synchronization of an audio capture program and a streamed audio file, and for transmitting the captured audio data to a server. The synchronization program comprises the following components, (1) an audio stream rendering component capable of being controlled via a script, (2) a scripting component linked to a user interface, (3) an audio capture controller component that can receive the script commands and issues directives to an audio capture engine, (4) an audio capture engine that communicates with an audio hardware subsystem of a personal computer, and (5) a data transmission component to communicate audio data to a server.

The audio stream rendering component must be capable of notifying other software components about event conditions or state changes immediately upon the occurrence of any one of the following events: (a) the beginning of a buffer stream, (b) the beginning of a rendered stream, and (c) completion of the rendering of a stream. The scripting component must be able to receive any of the above mentioned notification events from the audio stream rendering component.

The scripting component may further include the capability of scripting the audio capture controller component so that the scripting component can initialize, start, and stop the audio capture operation. The audio capture controller component must be able to respond to control commands issued from the scripting component. The audio capture controller component must also be capable of directing the audio capture engine, and provide a graphical user interface.

The graphical user interface includes controls that allow a user to start and stop the audio rendering and audio capture engine. The graphical user interface also provides a status display to the user so that the user knows when the audio capture engine has been started and when it has been stopped, thereby alerting the user when his or her performance is being recorded.

Additionally, the audio capture engine may provide feedback information on the capture process. That is, if an error occurs during capture, a message should be displayed thereby notifying the users of the problem. Alternatively, if no errors are received the audio capture engine could display the amount of time remaining to stream the audio file, or the amount of available space on the client device to save the recorded file.

The synchronization program described above may be utilized in the following manner. A user initiates the synchronization program by launching the program on a client device. A graphical interface is presented to the user. The graphical interface allows the user to select from a plurality of audio files in which at least one track is missing. For example, a vocal or instrumental track may be missing thereby allowing the user to practice and record a vocal or instrumental performance. When the user selects an audio file, the user's input sends an event notification that is received by the scripting component and the file is streamed to the client from a server. The scripting component is initiated and instructs the audio rendering component to begin streaming the selected audio file, the scripting component also instructs the audio capture controller component to prepare for audio capture. When the audio stream rendering component transitions from a buffering state to a playback state, an event notification is sent from the audio stream-rendering component. The scripting component receives the event notification and immediately commands the audio capture controller to initiate audio capture. As the audio capture engine proceeds to capture the user's performance, the audio capture device notifies the audio capture controller component of the progress of the recording. The progress of the audio capture device may be displayed to the user in a graphical interface.

The user seeing this information may continue to record his or her performance or may choose to terminate the recording and reset the streamed audio file and the audio recording device.

Once the streamed audio file reaches its end, a third event notification is transmitted from the audio stream rendering component. The third event notification is received by the scripting component. Then the scripting component instructs the audio capture controller to stop audio capture.

Upon termination of the audio capture, the audio capture engine provides notification to the user through the graphical interface that the audio capture has stopped.

The beginning of the audio file recorded by the audio capture device is synchronized exactly with the beginning of the streamed audio file, thereby eliminating the need by the user to do any post processing to align the timing of the tracks.

In one embodiment of the present invention, the user is able to stream an audio file from a server device to a client device through the use of an audio stream player. This provides the user with the benefit of not having to download a large audio file from a server device to the client computer. Thereby the present invention allows the user to generate a recording almost instantly, without having to wait for the downloaded audio file. Furthermore, the streamed audio file is not stored on the client computer thereby freeing up resources on the client computer. Additionally, because the streamed file is not being saved on the client hard drive, there is less likelihood of the hard drive failures that result from transferring and manipulating large audio files.

The present invention also provides a mechanism for transmitting the performance captured on the client device to a server device for mixing. Performing the mixing process on the server rather than on the client is advantageous because a high quality version of the streamed audio accompaniment can be made available for mixing simply by storing it on the server's storage device. Also, the server itself can be a much more powerful computing engine than is available to typical users. The mix may be accomplished on the server because the present invention times the start of the user's performance exactly with both the streamed audio file and its high quality mirrored version on the server, therefore the high quality version may be utilized without having to perform any time alignment of the two files.

Another benefit of transmitting the captured audio to the server for mixing is that expensive multi-track recording and mixing programs are not required. Furthermore, the user does not have to have the experience required to engineer a multi-track recording.

The synchronization method and its individual components will be described in greater detail below with reference to the included drawings. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

BRIEF DESCRIPTION OF THE DRAWINGS

FIG. 3A Is a partial functional flow diagram illustrating an embodiment of the present invention continued on FIG. 2B.

FIG. 3B Is a high level function flow diagram of the present invention continued from FIG. 3A.

FIG. 4A Is a partial functional flow diagram illustrating an embodiment of the present invention continued on FIG. 4B.

DETAILED DESCRIPTION OF THE PRESENT INVENTION

Throughout this description reference will be made to a personal computer running Windows® and having associated components installed therein; one ordinarily skilled in the art shall understand that this is merely exemplary and other operating systems may be utilized with the present invention. Additionally, the present invention will be described in detail with regard to the user of a RealNetworks RealPlayer®; one of ordinary skill in the art shall understand that this description is merely exemplary and should not be considered limiting in any manner and that any other streaming audio program may be utilized. Furthermore, though the present invention will be described in detail as being performed between a client device and a server device operatively coupled for communication over a network, it shall be understood that the present invention may be performed on a client device independent of being operatively coupled to a server device.

Figure 1A:
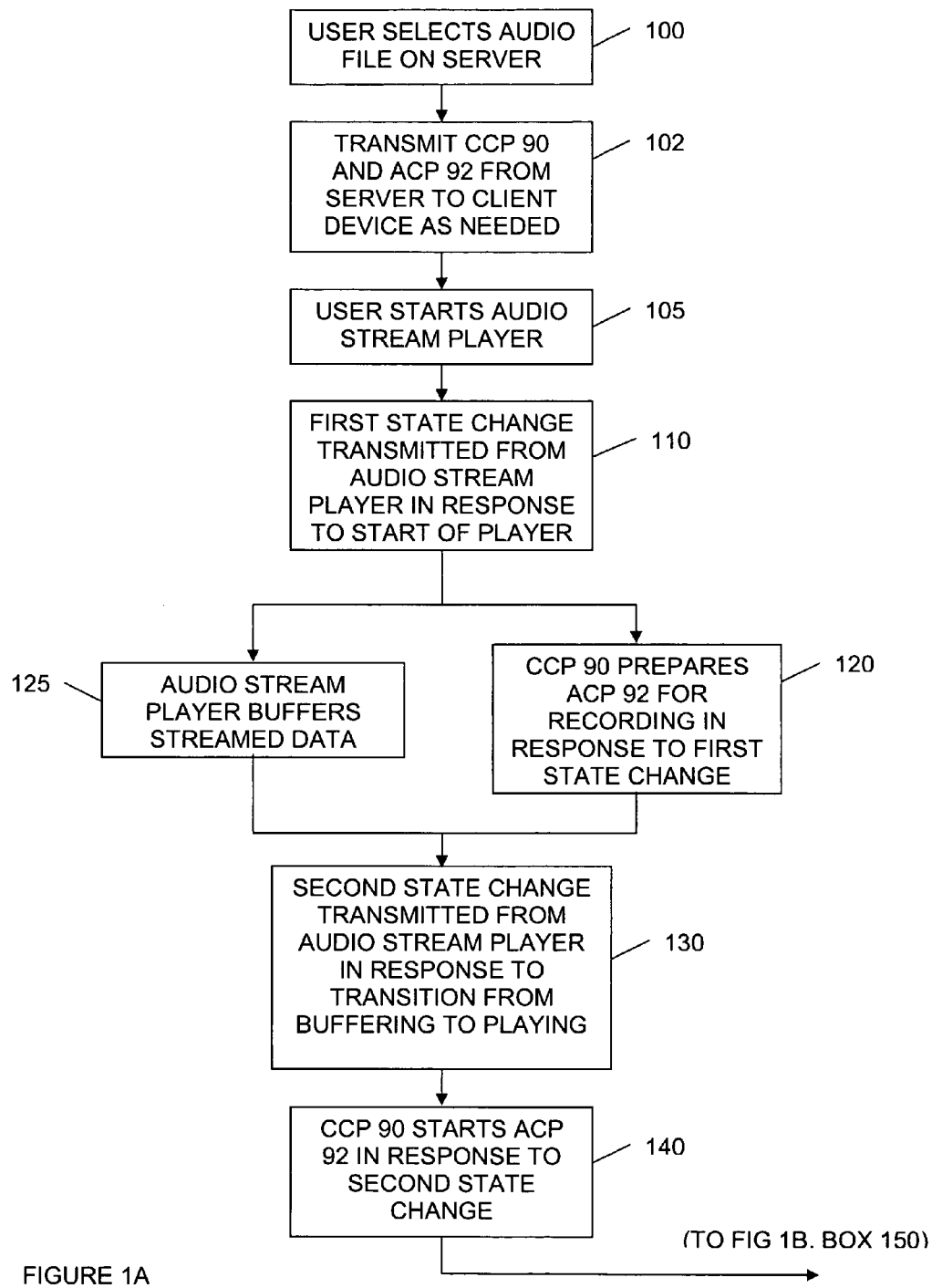
FIG. 1A Is a partial functional flow diagram illustrating an embodiment of the present invention continued on FIG. 1B.
Figure 1B:
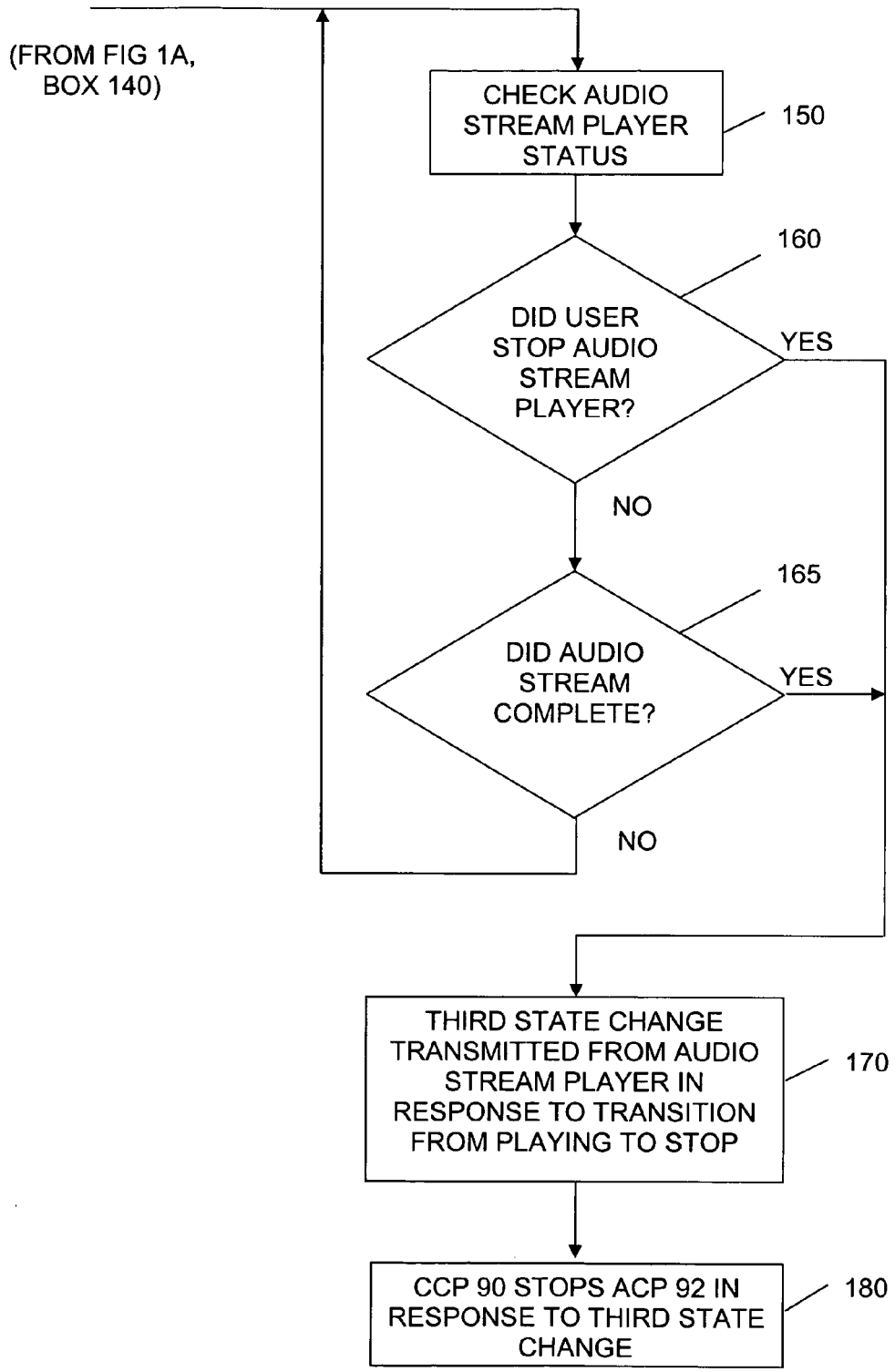
FIG. 1B Is a partial high level function flow diagram of the present invention continued from FIG. 1A.

Referring now to FIG. 1 there is shown a functional flow diagram of the present invention. At BOX 100, a user initiates the start of the present invention by logging into a server device from a client device operatively coupled for communication over a network. For example, the user may be utilizing a personal computer connected to a server device utilizing the Internet. After logging into the server device the user is presented with a graphical interface or "web page" that provides a plurality of choices. For example, the user may be presented with a list of songs with which the user may perform. Alternatively, the user may be provided with only a single choice in the case of utilizing the present invention in a classroom environment. At BOX 100, the user selects an audio file to be streamed from the server device over a network connection.

At BOX 102, in response to the user selection received in BOX 100, the server transmits a capture control program (CCP) 90 and an audio capture program (ACP) 92 from the server device to the client device. If either the CCP 90 or the ACP 92 already exists on the client device from previous operation of the system, it is not downloaded again. CCP 90 is adapted to receive event conditions or state change notifications transmitted from an audio stream player and to provide start, pause and stop controls for the player within the web page. CCP 90 is further adapted to control the ACP 92 disposed within the client device.

At BOX 105, the user initiates an audio stream player for playback of the selected audio file through the controls embedded in the web page.

At BOX 110, a first state change is transmitted from the audio stream player in response to the initiation of the audio stream player. For example, RealNetworks RealPlayer® transmits state changes, or event notifications in response to changes in the program's state. For example, when RealPlayer® changes from buffering to playback a state change is transmitted due to this transition.

At BOX 125, the audio file selected by the user begins to stream from a server device to the client device over a network and the audio stream player buffers data from the stream in memory on the client system until enough data are captured to ensure uninterrupted playback. Simultaneously, at BOX 120, CCP 90 prepares the ACP 92 for recording in response to the first state change transmitted in BOX 110. As shown in FIG. 1, the processes in both BOX 125 and BOX 120 are performed at the same time in response to the first state change that is transmitted by the audio stream player. Both processes must be completed prior to advancing to BOX 130. Typically the process of BOX 120 is completed much more rapidly than the process of BOX 125, so it is acceptable for the program to advance to BOX 130 upon completion of BOX 125.

At BOX 130, a second event condition is transmitted from the audio stream player in response to the state change of the audio stream player when it transitions from buffering to streamed playback.

At BOX 140, CCP 90 initiates the ACP 92, disposed on the client device, in response to the second state change transmitted from the audio stream player, and the audio capture is started.

At BOX 150, CCP 90 checks the status of the audio stream player to ensure that the audio file is streaming.

At Diamond 160, it is determined whether or not the user has stopped the audio stream player. If the player has not been stopped then the process of Diamond 165 is performed.

If it is determined that the user has stopped the audio stream player, then BOX 170 is performed. A user may wish to stop the audio stream player if they are not pleased with their performance, or if they are interrupted in the middle of their performance or for any number of other reasons.

At Diamond 165 it is determined whether the audio stream has been completed, that is if the end of the audio stream has been reached. If it is determined that the audio stream has not been completed then the process loops back to BOX 150 and is repeated as described above. If it is determined that the audio stream has been completed then BOX 170 is performed.

At BOX 170, a third state change is transmitted from the audio stream player in response to the player's transition from streaming to stopping.

At BOX 180, CCP 90 stops the audio capture ACP 92 in response to the third state change transmitted from the audio stream player.

Figure 2A:
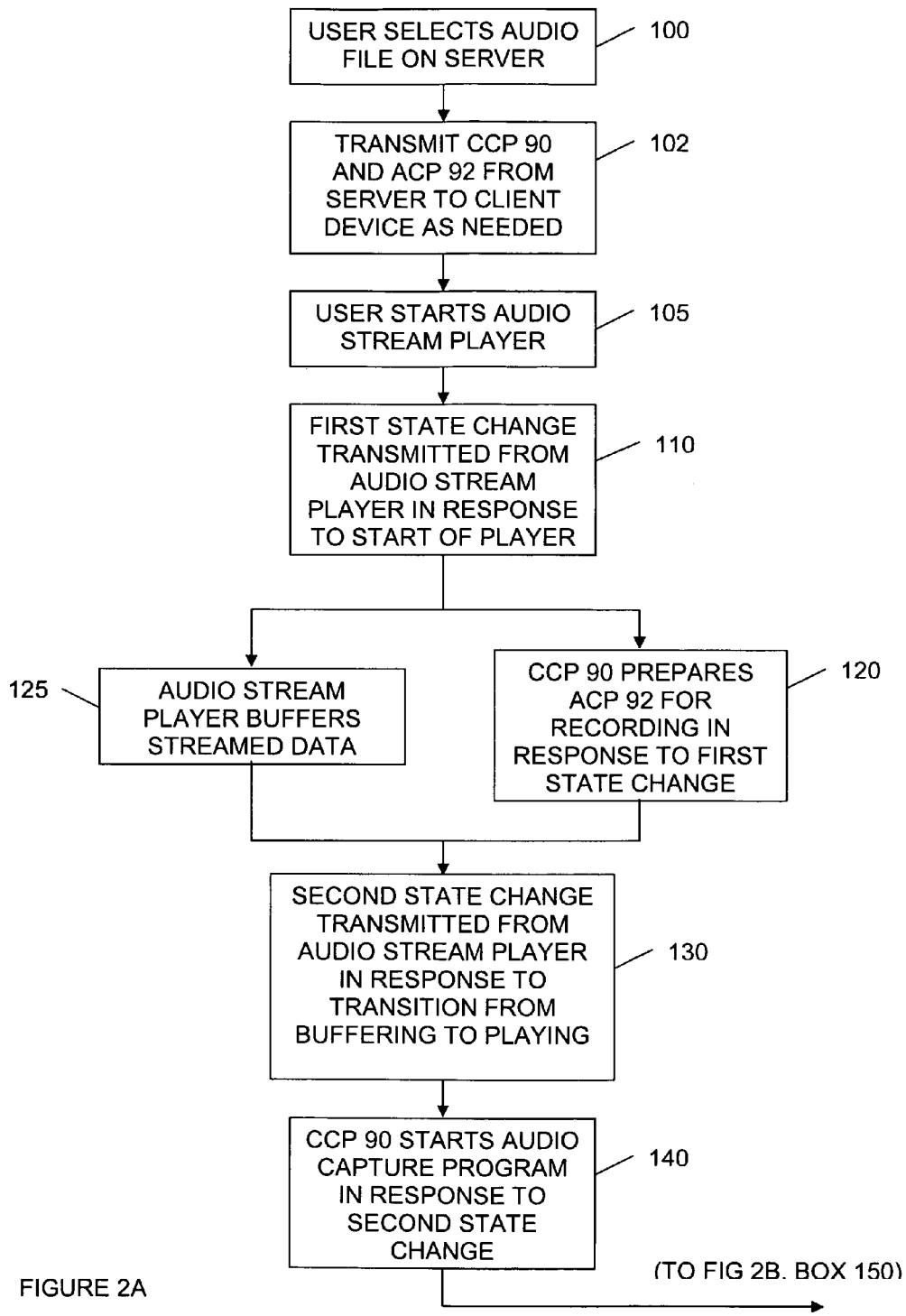
FIG. 2A Is a partial functional flow diagram illustrating an embodiment of the present invention continued on FIG. 2B.
Figure 2B:
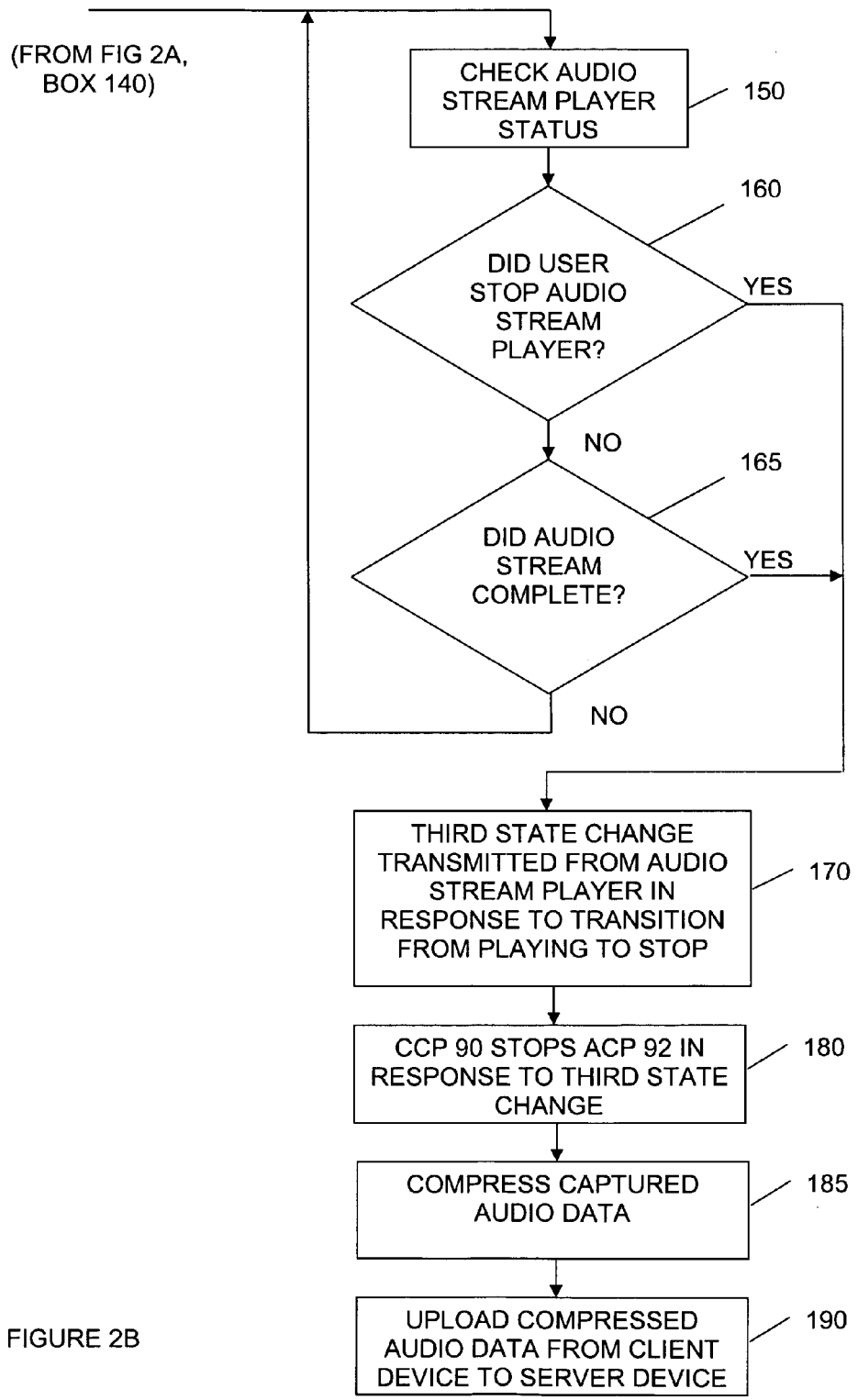
FIG. 2B Is a partial high level function flow diagram of the present invention continued from FIG. 2A.

Referring to FIG. 2 there is shown a functional block diagram of the method described above further including the steps shown in BOXES 185 and 190.

At BOX 185, the data captured on the client device by the audio capture program, ACP 92, is compressed using one of many commonly available programs. For example, the audio data captured and saved on the client computer may have been saved in an uncompressed format such as WAV. At BOX 185, the WAV file is compressed into a format such as MP3 or RM. The data is compressed so that the file uploads to the server device more rapidly. Also, if the captured audio file were stored on the client computer, it would utilize less storage space on the client device.

At BOX 190, the compressed audio file is uploaded to the server device over a network connection. For example, the client device may be coupled to the server device over the Internet.

Referring now to FIG. 3 there is shown a functional block diagram illustrating an alternative embodiment of the present invention.

Referring now to BOX 200, a user logs onto a server device from a client device that is operatively coupled for communication to the server device over a network. After logging onto the server device, the user is presented with a graphical display indicating at least one audio file that they may choose to download. The audio file may be missing at least one track that the user will perform, or alternatively the audio file may contain instructions for the user to follow. For example, if the audio file is a language lesson the file may contain prompts notifying the student when the student is to perform her or his part in the dialog. The audio file that was chosen by the student is downloaded from the server device to a storage device on the client device. The storage device may comprise any computer readable medium such as a hard drive, compact disc recordable/rewritable, or random access memory space.

At BOX 202, capture control program (CCP) 390 and audio capture program (ACP) 392 are transmitted from the server device to the client device. CCP 390 is adapted to receive event conditions or state change notifications transmitted from an audio playback program. CCP 390 is further adapted to control audio capture ACP 392. If either CCP 390 or ACP 392 already exists on the client device from previous operation of the system, it is not downloaded again.

At BOX 203, the audio capture program, ACP 392, is prepared for recording.

At BOX 205, the user, having initiated an audio playback program on the client device, issues a command to the audio playback program to begin playing of the downloaded audio file.

At BOX 210, in response to requesting playback of the downloaded audio program, CCP 390 detects a first state change transmitted from the audio playback program.

At BOX 230, as the audio playback program begins playback of the downloaded audio file; a second state change is transmitted from the audio player.

At BOX 240, in response to the second state change transmitted from the audio playback device, CCP 390 directs ACP 392 to begin recording.

At BOX 250, CCP 390 checks the status of the audio playback program to ensure that the audio file is being played.

At Diamond 260 it is determined whether or not the user has stopped the audio player. If the player has not been stopped then the process of Diamond 265 is performed. If it is determined that the user has stopped the audio player, then BOX 270 is performed. A user may wish to stop the audio player if they are not pleased with their performance, or if they are interrupted in the middle of their performance or for any number of other reasons.

At Diamond 265, it is determined whether the audio playback has been completed, that is, if the end of the audio file has been reached. If it is determined that the audio playback is not complete, then the process loops back to BOX 250 and is repeated as described above. If it is determined that the playback is complete, then BOX 270 is performed.

At BOX 270, a third state change is transmitted from the audio player in response to the player's transition from streaming to stopping.

At BOX 280, CCP 390 stops the ACP 392 in response to the third state change transmitted from the audio player.

Figure 4B:
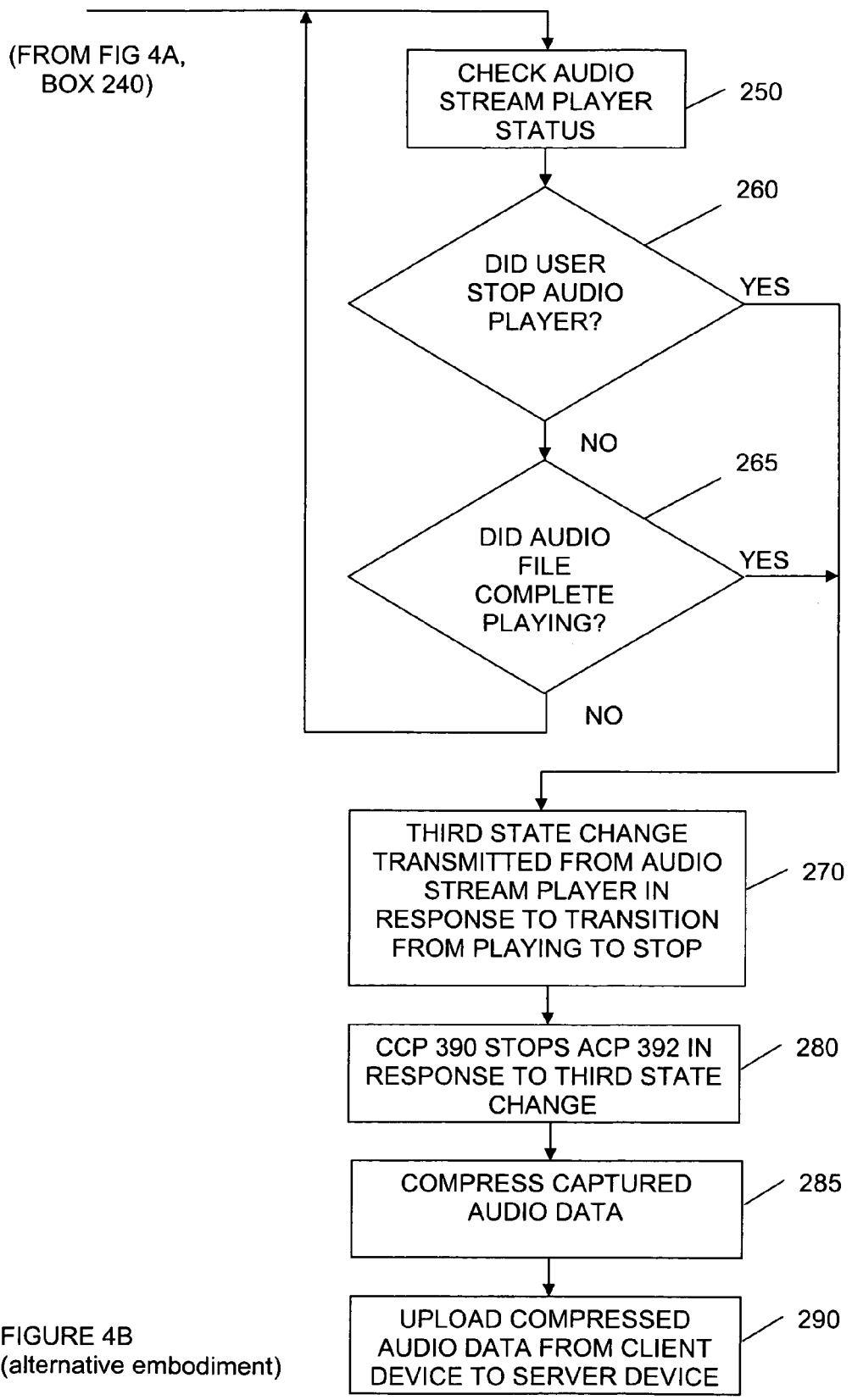
FIG. 4B Is a partial high level function flow diagram of the present invention continued from FIG. 4A.

Referring to FIG. 4 there is shown a functional block diagram of the method described above further including the steps shown in BOXES 285 and 290.

At BOX 285, the data captured on the client device by the audio capture ACP 392 is compressed using one of many commonly available programs. For example, the audio data captured and saved on the client computer may have been saved in an uncompressed format such as WAV. At BOX 285, the WAV file is compressed into a format such as MP3 or RM. The data is compressed so that the file uploads to the server device more rapidly. Also, if the captured audio file were stored on the client computer, it would utilize less storage space on the client device.

At BOX 290, the compressed audio file is uploaded to the server device over a network connection. For example, the client device may be coupled to the server device over the Internet.

Although the present invention has been described with reference to an implementation utilizing the main processor of a personal computer, it will be clear to those skilled in the art that it could be implemented as a dedicated hardware subsystem embedded in a personal computer. The hardware subsystem would take the form of a dedicated digital signal processing unit with the ACP and CCP instantiated in firmware, installed in either the computer's soundcard or built into a dedicated circuit board residing on the computer's data bus.

The invention claimed is:

1. In a network system including at least one client device and at least one server device operatively coupled for communication, a method for synchronizing an audio capture program with a streamed audio file, the method comprising:

provided an audio capture program on said client device;

receiving by said server at least one selection request from a user at said client device;

providing a synchronization program on said client device;

streaming a digital audio file from said server device to said client device;

detecting, by said synchronization program, a first state change associated with an audio stream player disposed within said client device, said synchronization program preparing said audio capture program on said client device in response to said first state change;

detecting, by said synchronization program, a second state change associated with said audio stream player indicating the start of audio playback of the digital audio file;

said synchronization program initiating said audio capture program on said client device at a fixed time interval calculated from when said second state change is detected for synchronizing capture; and capturing data at said client device by said audio capture program operatively coupled to audio capture hardware at said client device.

2. The method of claim 1, wherein said method further comprises recording said data captured by said audio capture program on a storage medium disposed in said client device.

3. The method of claim 1, wherein said method further comprises, compressing said data captured by said audio capture program, streaming said compressed data to said server, and recording said compressed data on a storage medium disposed in said server device.

4. The method of claim 1, wherein said method further comprises stopping said audio capture program.

5. The method of claim 4, wherein said stopping said audio capture program comprises detecting, by said program, a third state change associated with said audio stream player, wherein said program stops said audio capture engine in response to said third state change.

6. The method of claim 4, wherein said stopping said audio capture program comprises detecting, by said program, a third state change associated with receiving a second selection from said user, wherein said program stops said audio capture engine in response to said third state change.

7. The method according to claim 1, further comprising uploading said captured data from said client device to said server device.

8. The method according to claim 7, wherein said captured data is compressed prior to said uploading.

9. The method of claim 1, wherein said network comprises the Internet.

10. The method of claim 1, wherein the step of providing a synchronization program on said client device includes the step of transmitting said synchronization program from said server device to said client device.

11. In a computing device, a method for synchronizing an audio capture program with an audio file, the method comprising:

receiving at least one selection request from a user on said computing device;

providing an audio playback program on said computing device;

providing an audio capture program on said computing device;

providing at least one audio file on said computing device; and providing a synchronization program on said computing device;

receiving, by said synchronization program, a first event condition from said audio playback program, said first event condition being associated with audio playback;

preparing by said synchronization program, said audio capture program in response to said first event condition;

detecting, by said synchronization program, a second state change associated with said audio playback program; said second state change indicating the start of audio playback;

directing, by said synchronization program, said audio capture program to begin recording a user's performance at said computing device in response to said second state change.

12. The method of claim 11, wherein said program detects a third state change.

13. The method of claim 12, wherein said program stops said audio capture program in response to said third state change.

14. The method of claim 12, wherein said third state change is transmitted by said audio playback program.

15. The method of claim 12, wherein said third state change is transmitted by said program in response to a second selection from said user.

16. The method of claim 11, wherein said audio playback program comprises an audio stream player.

17. The method of claim 11, wherein said computing device is connected to the Internet.

18. The method of claim 11, wherein said user's performance is recorded on said computing device.

19. The method of claim 18, wherein said user's, performance is transmitted from said computing to a server device.

20. The method of claim 19, wherein said user's performance is compressed prior to said transmittal from said computing device to said server device.

21. The method of claim 11, wherein said user's performance is recorded on a server device.

22. The method of claim 11, wherein the step of providing at least one audio file on said client device includes the step of transmitting said audio file from a server device to said client device.

23. The method of claim 11, wherein the step of providing a synchronization program on said client device includes the step of transmitting said synchronization program from said server device to said client device.

24. In a network system including at least one client device and at least one server device operatively coupled for communication, an apparatus for synchronizing an audio capture program with a streamed audio file, said apparatus comprising:

a means for receiving by said server device at least one selection request from a user at said client device;

a means transmitting a synchronization program from said server device-to said client device;

a means for streaming a digital audio file from said server device to said client device;

a means for detecting, by said synchronization program, a first state change associated with an audio stream player disposed within said client device, said synchronization program preparing said audio capture program on said client device in response to said first state change;

a means for detecting, by said synchronization program, a second state change associated with said audio stream player indicating the start of audio playback; and said synchronization program initiating said audio capture program on said client device at a fixed time interval calculated from when said second state change is detected for synchronizing capture.

25. The apparatus of claim 24, wherein said apparatus further comprises recording said data captured by said audio capture program on a storage medium disposed in said client device.

26. The apparatus of claim 24, wherein said method further comprises, compressing said data captured by said audio capture program, streaming said compressed data to said server, and recording said compressed data on a storage medium disposed in said server device.

27. The apparatus of claim 24, wherein said method further comprises stopping said audio capture program.

28. The apparatus of claim 27, wherein said stopping said audio capture program comprises detecting, by said program, a third state change associated with said audio stream player, wherein said program stops said audio capture engine in response to said third state change.

29. The apparatus of claim 27, wherein said stopping said audio capture program comprises detecting, by said program, a third state change associated with receiving a second selection from said user, wherein said program stops said audio capture engine in response to said third state change.

30. The apparatus according to claim 24, further comprising uploading said recording from said client device to said server device.

31. The apparatus according to claim 30, wherein said recording is compressed prior to said uploading.

32. The apparatus according to claim 24, wherein said network comprises the Internet.

33. In a network system including at least one client device and at least one server device operatively coupled for communication, an apparatus for synchronizing an audio capture program with an audio file, the apparatus comprising:
- a means for receiving by said server device at least one selection request from a user at said client device;
- a means for providing an audio playback program on said client device;
- a means for providing an audio capture program on said client device;
- a means for providing at least one audio file to said client device; and
- a means for providing a synchronization program to said client device, wherein said synchronization program receives a first event condition from said audio playback program, said first event condition being associated with audio playback, said synchronization program prepares an audio capture program in response to said first event condition; said synchronization program detects a second state change associated with said audio playback program indicating the start of audio playback, whereby said synchronization program directs said audio capture program to begin recording a user's performance in response to said second state change.

34. The apparatus of claim 33, wherein said program detects a third state change.

35. The apparatus of claim 34, wherein said program stops said audio capture program in response to said third state change.

36. The apparatus of claim 34, wherein said third state change is transmitted by said audio playback program.

37. The apparatus of claim 34, wherein said third state change is transmitted by said program in response to a second selection from said user.

38. The apparatus of claim 33, wherein said audio playback program comprises an audio stream player.

39. The apparatus of claim 33, wherein said network comprises the Internet.

40. The apparatus of claim 33, wherein said user's performance is recorded on said client device.

41. The apparatus of claim 40, wherein said user's performance is transmitted from said client device to said server device.

42. The apparatus of claim 41, wherein said user's performance is compressed prior to said transmittal from said client device to said server device.

43. The apparatus of claim 33, wherein said user's performance is recorded on said server device.

44. The method of claim 33, wherein the step of providing at least one audio file on said client device includes the step of transmitting said audio file from said server device to said client device.

45. The method of claim 33, wherein the step of providing a synchronization program on said client device includes the step of transmitting said synchronization program from said server device to said client device.

46. A program storage device readable by a machine, tangibly embodying a program of instructions executable by the machine within a network system including at least one client device and at least one server device operatively coupled for communication, a method for synchronizing an audio capture program with a streamed audio file, said method comprising:
- receiving by said server at least one selection request from a user at said client device;
- providing a synchronization program on said client device;
- streaming a digital audio file from said server device to said client device;
- detecting, by said synchronization program, a first state change associated with an audio stream player disposed within said client device, said synchronization program preparing said audio capture program on said client device in response to said first state change;
- detecting, by said synchronization program, a second state change associated with said audio stream player indicating the start of audio playback;
- said synchronization program initiating said audio capture program on said client device at a fixed time interval calculated from when said second state change is detected for synchronizing capture; and
- capturing data at said client device by said audio capture program operatively coupled to audio capture hardware at said client device.

47. The method of claim 46, wherein said method further comprises recording said data captured by said audio capture program on a storage medium disposed in said client device.

48. The method of claim 46, wherein said method further comprises, compressing said data captured by said audio capture program, streaming said compressed data to said server, and recording said compressed data on a storage medium disposed in said server device.

49. The method of claim 46, wherein said method further comprises stopping said audio capture program.

50. The method of claim 49, wherein said stopping said audio capture program comprises detecting, by said program, a third state change associated with said audio stream player, wherein said program stops said audio capture engine in response to said third state change.

51. The method of claim 49, wherein said stopping said audio capture program comprises detecting, by said program, a third state change associated with receiving a second selection from said user, wherein said program stops said audio capture engine in response to said third state change.

52. The method according to claim 46, further comprising uploading said captured data from said client device to said server device.

53. The method according to claim 52, wherein said captured data is compressed prior to said uploading.

54. The method according to claim 46, wherein said network comprises the Internet.

55. The method of claim 46, wherein the step of providing a synchronization program on said client device includes the step of transmitting said synchronization program from said server device to said client device.

56. A program storage device readable by a machine, tangibly embodying a program of instructions executable by the machine within a network system including at least one client device and at least one server device operatively coupled for communication, a method for synchronizing an audio capture program with an audio file, said method comprising:
   receiving at least one selection request from a user on said client device;
   providing an audio playback program on said client device;
   providing an audio capture program on said client device;
   providing at least one audio file on said client device; and
   providing a synchronization program on said client device, wherein said synchronization program receives a first event condition from said audio playback program, said first event condition being associated with audio playback, said synchronization program prepares an audio capture program associated with said first event condition, said synchronization program detects a second state change associated with said audio playback program when said audio playback begins, whereby said synchronization program directs said audio capture program to begin recording a user's performance at said computing device in response to said second state change.

57. The method of claim 56, wherein said program detects a third state change.

58. The method of claim 57, wherein said program stops said audio capture program in response to said third state change.

59. The method of claim 57, wherein said third state change is transmitted by said audio playback program.

60. The method of claim 57, wherein said third state change is transmitted by said program in response to a second selection from said user.

61. The method of claim 56, wherein said audio playback program comprises an audio stream player.

62. The method of claim 56, wherein said network comprises the Internet.

63. The method of claim 56, wherein said user's performance is recorded on said client device.

64. The method of claim 63, wherein said user's performance is transmitted from said client device to said server device.

65. The method of claim 64, wherein said user's performance is compressed prior to said transmittal from said client device to said server device.

66. The method of claim 56, wherein said user's performance is recorded on said server device.

67. The method of claim 56, wherein the step of providing at least one audio file on said client device includes the step of transmitting said audio file from said server device to said client device.

68. The method of claim 56, wherein the step of providing a synchronization program on said client device includes the step of transmitting said synchronization program from said server device to said client device.

69. The method of claim 56, wherein the audio file is provided by the user.

\* \* \* \* \*